United States Patent [19]

Murata

[11] 4,354,380

[45] Oct. 19, 1982

[54] FUEL INJECTION PUMP OPERATING CONDITION DETECTOR

[75] Inventor: Yoichi Murata, Nagoya, Japan

[73] Assignee: Toyota Jidosha Kogyo Kabushiki Kaisha, Toyota, Japan

[21] Appl. No.: 211,774

[22] Filed: Dec. 1, 1980

[30] Foreign Application Priority Data

Jul. 2, 1979 [JP] Japan .................................. 54-84304

[51] Int. Cl.³ ............................................ G01M 15/00

[52] U.S. Cl. ...................................... 73/119 A; 336/30

[58] Field of Search ...................... 73/119 A, 118, 116, 73/117.3; 336/30; 417/63

[56] References Cited

U.S. PATENT DOCUMENTS 3,731,527 5/1973 Weaver ............................ 73/119 A 4,185,494 1/1980 Yelke ................................ 73/119 A

*Primary Examiner*—Jerry W. Myracle

*Attorney, Agent, or Firm*—Stevens, Davis, Miller & Mosher

[57] ABSTRACT

A present invention relates to fuel pump operating condition detectors, and more particularly to a fuel injection pump operating condition detector suitable for use in a distributor type fuel injection pump in a diesel engine mounted in a motor car, wherein fuel is pressure fed by a reciprocating plunger. The detector comprises an unpenetrated mount formed in a pump housing of the fuel injection pump adjacent the plunger or a reciprocating part operatively associated with the plunger and an electromagnetic pickup, the forward end of a core of which is fixed to the mount, and said electromagnetic pickup can detect through its output waveshape the running condition of the engine or the top and bottom dead centers of the plunger of the pump, which are the characteristics equal to a fuel injection timing, and a fuel pressure feed timing.

6 Claims, 5 Drawing Figures

FUEL INJECTION PUMP OPERATING CONDITION DETECTOR

BACKGROUND OF THE INVENTION

1. Field of the Invention

The present invention relates to fuel injection pump operating condition detectors, and more particularly to a fuel injection pump operating condition detector suitable for use in a distributor type fuel injection pump in a diesel engine mounted on a motor car, wherein fuel is pressure fed by a reciprocating plunger.

2. Description of the Prior Art

Recently, diesel engines have been mounted on not only large-sized vehicles such as trucks but also passenger motor cars and the like based on the economics in fuel consumption thereof. Consequently, there has been voiced for necessity of providing tachometers for detecting the rotation speed of the diesel engines. However, the conventional diesel engines have no ignitors unlike the gasoline engines, and hence, electric tachometers cannot be operated by electrical wirings, so that the rotation speed of engines are taken out by wires and the like to move mechanical tachometers. From the abovedescribed reasons, the rotation speed take-out portion is complex in construction, oil leakage may be caused, and the arrangement of wires may be restricted. Furthermore, there has not been any means for easily measuring a fuel injection timing. Consequently, heretofore, there have been such disadvantages that the set condition of the fuel injection pump cannot be finely adjusted at the time of assembling the engine, hence, only such a measure is taken as to match coincidence marks provided on the engine body and the injection pump body are mechanically matched, in order to perform the fine adjustment, it is necessary to remove the plunger portion of the fuel injection pump and verify the fuel injection by visual inspection, and, the adjustment cannot be performed during running condition of the engine.

There have been proposed to detect the running condition of the engine such methods being similar to the methods of sensing the running condition of machines in general that reflection marks such as light reflecting sheets are attached to rotatable parts including a flywheel, crankshaft, camshaft and crankwheel for example, the light is emitted to the abovedescribed parts and pulses of the reflected light are detected by phototransistors and the like and counted, or metallic ridges or grooves are formed on the rotatable parts and the changes in magnetic flux are detected therefrom and counted. However, the abovedescribed methods have been improper when an engine room space is excessively limited as with a vehicle-mounted engine or when simplified performance inspections are performed as on an engine production line.

SUMMARY OF THE INVENTION

The present invention has been developed in view of the abovedescribed disadvantages of the prior art and has as its object the provision of a fuel injection pump operating condition detector capable of detecting reliably and in a simplified manner the operating condition of a diesel engine provided therein with a distributor type fuel injection pump.

The present invention is intended for that, in a fuel injection pump operating condition detector, wherein fuel is pressure fed by a reciprocating plunger, an unpenetrated mount formed in a pump housing of the fuel injection pump adjacent the plunger or a reciprocating part operationally associated with the plunger and an electromagnetic pickup, the forward end of a core of which is fixed to the mount are provided, so that an inexpensive an large-sized electromagnetic pickup can sense the running condition of the engine or the top and bottom dead centers of the plunger of the pump, which are the characteristics equal to a fuel injection timing, and a fuel pressure feed timing. Furthermore, in a vehicle provided therein with no engine tachometer, only the removal of the electromagnetic pickup can eliminate the leakage of oil from the fuel injection pump. Further, during running of the engine, the dynamic movement of the fuel pressure feed timing can be readily measured and the timing of the injection pump can be sensed. Further, at the time of assembling the engine, the set conditions of the fuel injection pump and engine can be verified in a simplified manner. Furthermore, as the electric circuit for the tachometer, it suffices to utilize a commonly used simplified circuit, which can be less expensively produced than in the case of the mechanical tachometer.

BRIEF DESCRIPTION OF THE DRAWINGS

The abovementioned features and object of the present invention will become more apparent by reference to the following description taken in conjunction with the accompanying drawings, wherein like referenced numerals denote like elements, and in which.

DETAILED DESCRIPTION OF THE INVENTION

Figure 1:
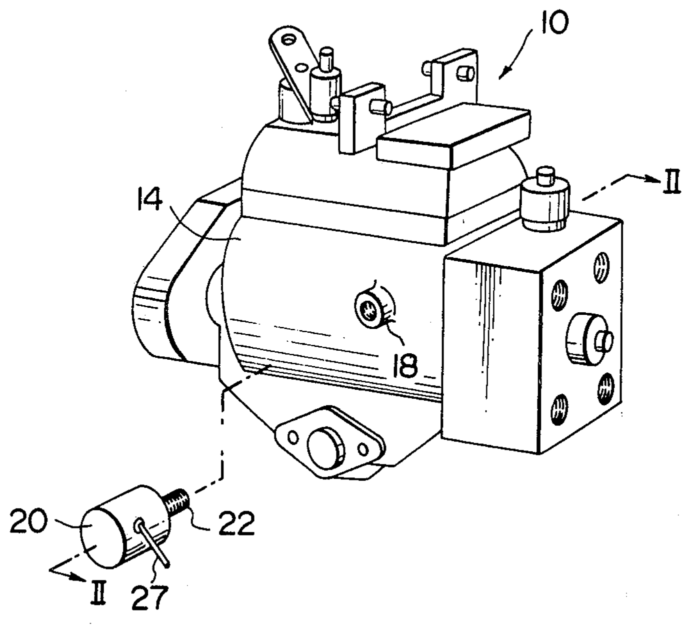
FIG. 1 is a disassembled perspective view showing the fuel injection pump provided therein with the fuel injection pump operating condition detector according to the invention.
Figure 2:
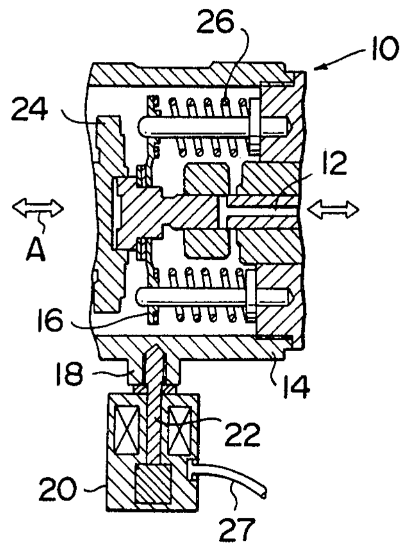
FIG. 2 is a sectional view taken along the line II—II in the embodiment described above.

Detailed description will hereunder be given of the embodiments with reference to the drawings. As shown in FIGS. 1 and 2, a first embodiment of the present invention is of such an arrangement that, in a distributor type fuel injection pump 10 wherein fuel is pressure fed by a reciprocating plunger 12, there are provided: a mount 18 constituted by an unpenetrated, internally threaded hole, which is formed in a pump housing 14 of the fuel injection pump closest to the outer peripheral end of a lower spring seat 16 reciprocating in operational association with the aforesaid plunger 12, and an electromagnetic pickup 20, the forward end of externally threaded core of which is threadably coupled into the mount 18. Referring to the drawings, designated at 24 is a cam plate, 26 springs and 27 a lead wire.

Figure 3:
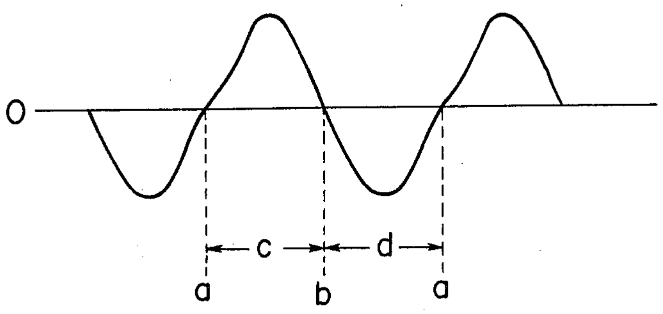
FIG. 3 is a graphic chart showing the output waveshape of the electromagnetic pickup in the embodiment described above.

Description will now be given of action. Rotation of the shaft of the injection pump causes the cam plate 24 to reciprocate in directions indicated by an arrow A in the drawing, and, likewise, the plunger 12 and lower spring seat 16 reciprocate in the directions indicated by the arrow. Then, the electromagnetic pickup 20 detects the changes in magnetic flux due to the movement of the lower spring seat 16 through the core 22 to emit the waveshape shown in FIG. 3 as an output. In FIG. 3, a point 'a' of the voltage OV corresponds to the top dead center of the plunger 12 and a point 'b' corresponds to the bottom dead center. Furthermore, a section 'c' corresponds to a duration, during which the fuel injection pump 10 takes in fuel, and a section 'd' corresponds to a duration, during which fuel is pressure fed. Consequently, the output from the electromagnetic pickup 20 is processed by use of a comparator or the like so as to readily detect a fuel injection cycle (the inverse number of the rotation number of the engine) and a fuel pressure feed timing.

In this embodiment, the lower spring seat 16 is disposed to the extreme right in the drawing, where the speed of oscillation is zero and the width of oscillation is least, in opposed relation with the forward end of the core 22 of the electromagnetic pickup 20, whereby the influence of the noises is lower than that when the lower spring seat 16 is moved to the left in the drawing, where the width of oscillation thereof is comparatively large, so that an output signal having a low noise component can be otained.

Figure 4:
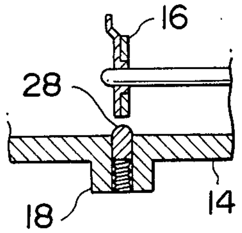
FIG. 4 is a sectional view showing the essential portions of a second embodiment of the fuel injection pump operating condition detector according to the present invention.

FIG. 4 shows a second embodiment of the present invention. In this embodiment, unpenetrated mount 18 is formed such that a through-hole is penetrated through the pump housing 14 and a top core 28 having a semicircular forward end and made of a material identical with that of the core 22 is press-fitted into the through-hole at the inner side of the pump housing 14. Other respects in this embodiment are similar to those in the first embodiment, so that detailed description will be omitted.

In this embodiment, the forward end of the core 22 of the electromagnetic pickup 20 equivalently approaches the lower spring seat 16, so that the detecting sensibility can be increased.

Figure 5:
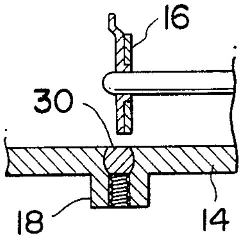
FIG. 5 is a sectional view showing the essential portions of a third embodiment thereof.

FIG. 5 shows a third embodiment of the present invention. In this embodiment, in casting the pump housing 14, a barrel-type top core 30 is cast simultaneously, whereby the unpenetrated mount 18 is formed. Other respects in this embodiment are similar to those in the first embodiment, so that detailed description will be omitted.

In this embodiment also, the forward end of the core 22 of the electromagnetic pickup 20 equivalently approaches the lower spring seat 15, so that the detecting sensibility can be increased.

Additionally, in each of the abovedescribed embodiments, the core of the electromagnetic pickup is adapted to detect the reciprocating motion of the lower spring seat of the fuel injection pump, so that the electromagnetic pickup can easily approach the reciprocating part from outside. Furthermore, safety is higher at a portion adjacent the spring seat 16 being lower in fuel pressure than at a portion adjacent the plunger. Further, the position to which the electromagnetic pickup should be fixed is not limited to this, but can be positioned at portions adjacent other reciprocating parts such as the cam plate.

Furthermore, in each of the embodiments described above, the mount is internally threaded and the externally threaded forward end portion of the core 22 of the electromagnetic pickup is threadably coupled into the internally threaded portion of the mount, so that the electromagnetic pickup 20 can be easily and reliably fixed to the fuel injection pump 10, thereby enabling to reducing the possibilities of picking up noises caused by vibrations and the like.

From the foregoing description, it should be apparent to one skilled in the art that the abovedescribed embodiment is but one of many possible specific embodiments which can represent the applications of the principles of the present invention. Numerous and varies other arrangements can be readily devised by those skilled in the art without departing from the spirit and scope of the invention.

What is claimed is:

1. A fuel injection pump operating condition detector wherein fuel is pressure fed by a reciprocating plunger, comprising an unpenetrated mount formed on a pump housing of the fuel injection pump adjacent the plunger or a reciprocating part operationally associated with the plunger and an electromagnetic pickup, the forward end of a core of which is fixed to said mount.

2. A fuel injection pump operating condition detector as set forth in claim 1, wherein a fuel injection cycle and a fuel pressure feed timing are detected through an output waveshape of said electromagnetic pickup.

3. A fuel injection pump operating condition detector as set forth in claim 1, wherein said unpenetrated mount is an unpenetrated, internally threaded hole formed at a position closest to the outer peripheral end of a lower spring seat reciprocating in operational association with said plunger, and an externally threaded forward end of a core of said electromagnetic pickup is threadably coupled into said mount.

4. A fuel injection pump operating condition detector as set forth in claim 1, wherein said unpenetrated mount includes a through-hole formed in said pump housing and a top core made of a material identical with the core of said electromagnetic pickup which is press-fitted into said through-hole at the inner side of said pump housing.

5. A fuel injection pump operating condition detector as set forth in claim 1, wherein said unpenetrated mount receives a barrel-shaped top core made of a material identical with the core of said electromagnetic pickup and cast at the side of said pump housing.

6. A fuel injection pump operating condition detector as set forth in one of claims 3 to 5, wherein said unpenetrated mount is formed at a position where the forward end of said electromagnetic pickup is opposed to one of the two positions where the speed of oscillation of the plunger becomes zero.

* * * * *